(No Model.)
C. ESPENSCHIED.
DEVICE FOR LEVELING AND ALIGNING SHAFTS.
No. 318,885. Patented May 26, 1885.
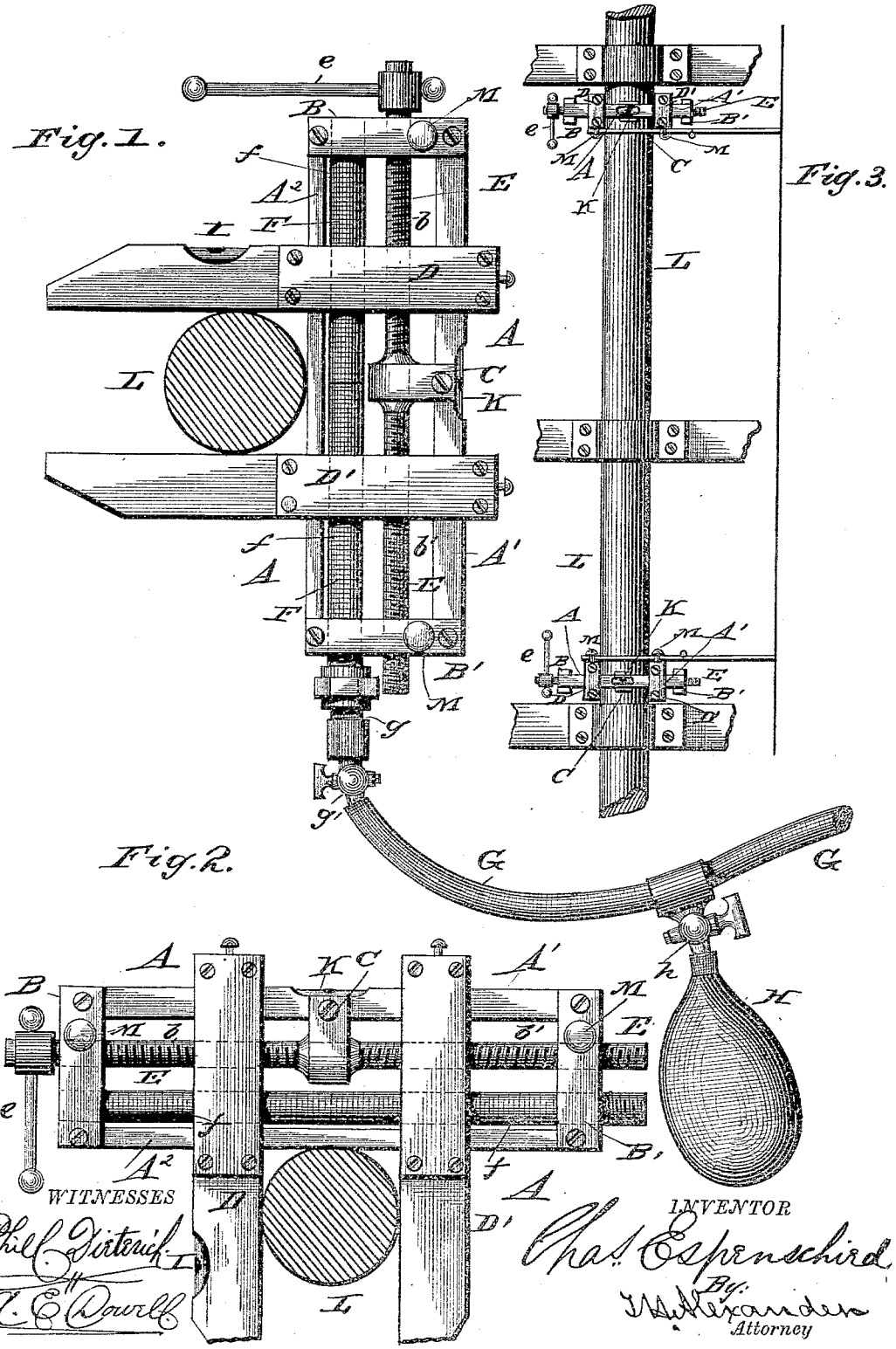

UNITED STATES PATENT OFFICE.

CHARLES ESPENSCHIED, OF HASTINGS, MINNESOTA.

DEVICE FOR LEVELING AND ALIGNING SHAFTS.

SPECIFICATION forming part of Letters Patent No. 318,885, dated May 26, 1885.

Application filed January 31, 1885. (No model.)

*To all whom it may concern:*

Be it known that I, CHARLES ESPENSCHIED, of Hastings, in the county of Dakota and State of Minnesota, have invented certain new and useful Improvements in Leveling and Aligning Shafts; and I do hereby declare that the following is a full, clear, and exact description thereof, reference being had to the accompanying drawings, and to the letters of reference marked thereon, which form part of this specification, in which—

Figure 1 is a side elevation of my improved apparatus for aligning a shaft. Fig. 2 is a similar view of the same as applied to a shaft for aligning the same. Fig. 3 is a plan view of the same.

This invention relates to improvements in mechanism to level and align the shafting of machinery, its object being to simplify and cheapen the labor of such leveling and aligning.

The invention mainly consists in clamping the shaft between two similar jaws made to travel in opposite directions upon a proper frame by means of a screw provided with similarly-pitched right and left threads, and bringing the center of the shaft, by means of a suitably-situated level, either horizontally or vertically in line with a centering-piece secured to the frame midway between the jaws.

The invention further consists in the construction and novel arrangement of parts hereinafter described, and pointed out in the claims.

In the accompanying drawings, A represents the frame of the device, of rectangular contour, and composed of the longitudinal bars A' A² and transverse end bars, B B', as shown.

C is a centering piece or block secured transversely upon the bar A' midway between the transverse bars B B'.

D D' are two similar jaws recessed upon their inner surfaces to fit snugly upon the bar A' and stand at right angles to the same.

E is a longitudinal screw, having bearings in the bars B B', and provided with the right and left threads $b$ and $b'$, which engage with transverse internally-threaded openings in the jaws B and B', respectively.

The jaws and screw are so arranged in relation to each other that the former will at all times be equally distant from the block C, and will simultaneously impinge upon its opposite sides when screwed home.

The screw E is rotated by means of the lever-handle $e$ in the usual manner.

F is a longitudinal gage-tube of glass, with its ends fitted into openings in the bars B B', and standing partially in front of the bar A²; and $f$ is a gage-scale for the same marked on the glass tube. Both ends of the tube F are open, and the end on the side opposite the lever-handle $e$ projects outward beyond the bar B, and connects with the rubber tube G by means of the coupling $g$. $g'$ is a cock on the said tube below the coupling. The other end of the tube G couples to the neck of a rubber bulb, H, as shown, the neck being provided with a cock, $h$, below its coupling with the tube G.

I is a level secured to the outer surface of the jaw D parallel with its inner or clamping surface, and K is a similar level secured to the outer surface of the bar A' in a position at right angles to the level I and the block C.

L is a shaft clamped between the jaws.

The neck of the bulb H is constructed to couple with two or more rubber tubes, G, connected with the tubes F of an equal number of leveling devices similar to the one above described.

The method of leveling a shaft is as follows: Two similar leveling devices are set on the shaft, one near each of its bearings, with the frame A on the side of the shaft, and the jaws D and D' respectively above and below the same. The jaws are then screwed to clamp the shaft lightly, and the frame turned until the level I indicates that the jaws are horizontal. The center of the shaft will then be in horizontal line with the center of the block C. The jaws are then clamped firmly on the shaft, the bulb H filled with liquid and coupled to the two tubes G, which are in turn coupled to the tubes F. The cocks $h$ and $g'$ $g'$ are then opened, and pressure on the bulb makes the liquid ascend to the same horizontal plane in the two gage-tubes F. If the surface of the water in the two gage-tubes is opposite similar numbers on the gage-scales, the shaft is level. If not, the said gage-scales indicate the departure from the horizontal, and the shaft is leveled accordingly, in the usual manner, by lowering or raising the boxes or bearings. If the shaft has more than two bearings, a leveling device may be clamped upon it near each end of said bearings and their markings compared.

To align a shaft, the tubes G and bulb H are detached from the device, and the studs of thumb-screws M M are engaged in threaded openings in the bars B B' to secure an aligning-rule. The frame A is then set on top of the shaft, the jaws D D' being on each side of the same. The jaws are then clamped as before, and the block C brought vertically above the center of the shaft by means of the level K. A cord or line is then stretched longitudinally over the center of the block C and secured at the ends, and observations and corrections made by moving the device from bearing to bearing. Should obstructions intervene to prevent this movement, a line may be similarly stretched on either side and a rule attached to the studs M, and the alignment corrected thereby; or a line may be stretched overhead and observations taken with a plumb line and bob.

Having described my invention, what I claim is—

1. In a device to level and align shafts, the combination, with a rectangular frame having attached a centering block or piece, of two similar jaws traveling in opposite directions on said frame, with their clamping-surfaces at right angles to the frame and equally distant from the centering-block, and levels to set the said clamping-surfaces either vertical or horizontal, substantially as specified.

2. In a device to level and align shafts, the combination, with a rectangular frame provided with a centering piece or block, and a screw having bearings in the end bars of said frame, and provided with right and left hand threads, respectively, on each side of the centering-block, of two similar jaws operated by said threads and sliding on the frame in opposite directions, with their clamping-surfaces at right angles to the same and equally distant from the centering-block, and levels to set the clamping-surfaces either vertical or horizontal, substantially as specified.

3. In a device to level shafts, the combination, with the frame A, having attached the gage-tube F, marked with the gage-scale $f$, and the centering-block C, jaws D D', right-and-left screw E, and level I, of the tube G and bulb H, substantially as specified.

4. The combination, with two similar leveling devices, each provided with a gage-tube, F, marked with a gage-scale, $f$, of a bulb, H, provided with a cock, $h$, and tubes G, each provided with a cock, $g'$, and connecting the bulb above its cock with the lower end of a tube, F, substantially as specified.

5. In a device to align shafting, the combination, with the frame A, having attached the centering-block C and level K, of the jaws D D' and right-and-left screw E, substantially as specified.

6. The combination of two or more shaft-centering devices adapted to be placed upon a shaft at different points, and provided with graduated glass tubes arranged to receive liquid from a common source under pressure, and indicate the differences of level of the points of the shaft upon which the centering devices are sustained, substantially as specified.

In testimony that I claim the foregoing as my own I affix my signature in presence of two witnesses.

CHAS. ESPENSCHIED.

Witnesses:
FRED. S. GARDNER,
GEORGE M. HEATH.